(12) United States Patent
Smith

(10) Patent No.: US 8,739,956 B2
(45) Date of Patent: Jun. 3, 2014

(54) SUPPORT STRUCTURE FOR RADIAL CONVEYOR

(75) Inventor: Roger G. Smith, Lake Oswego, OR (US)

(73) Assignee: Construction Equipment Company, Tualatin, OR (US)

( * ) Notice: Subject to any disclaimer, the term of this patent is extended or adjusted under 35 U.S.C. 154(b) by 0 days.

(21) Appl. No.: 13/274,167

(22) Filed: Oct. 14, 2011

(65) Prior Publication Data
US 2013/0092506 A1    Apr. 18, 2013

(51) Int. Cl.
*B65G 41/00* (2006.01)

(52) U.S. Cl.
USPC .......................... 198/306; 198/300; 180/6.48

(58) Field of Classification Search
USPC ......... 198/302, 306, 300, 312, 315; 180/6.48, 180/6.5
See application file for complete search history.

(56) References Cited

U.S. PATENT DOCUMENTS

| | | | | |
|---|---|---|---|---|
| 1,516,435 A | * | 11/1924 | Houghton et al. | 198/308.1 |
| 3,041,076 A | * | 6/1962 | Van Der Lely et al. | 239/654 |
| 3,067,858 A | * | 12/1962 | Loosli | 198/306 |
| 3,444,987 A | | 5/1969 | Palmer | |
| 3,598,224 A | * | 8/1971 | Oury | 198/301 |
| 4,135,614 A | * | 1/1979 | Penterman et al. | 198/306 |
| 4,202,422 A | | 5/1980 | McLean | |
| 4,469,191 A | * | 9/1984 | Truninger | 180/233 |
| 4,726,459 A | | 2/1988 | Vos | |
| 5,515,961 A | | 5/1996 | Murphy et al. | |
| 5,833,043 A | | 11/1998 | Schmidgall et al. | |
| 6,186,311 B1 | * | 2/2001 | Conner | 198/300 |
| 6,296,109 B1 | | 10/2001 | Nohl | |
| 6,805,229 B2 | * | 10/2004 | Dekoning | 198/313 |
| 6,929,113 B1 | * | 8/2005 | Hoover et al. | 198/812 |
| 6,941,737 B2 | * | 9/2005 | Kempf | 56/10.2 R |
| 7,448,453 B2 | * | 11/2008 | Tobin | 172/821 |
| 2004/0031662 A1 | | 2/2004 | Jacoba Dekoning | |
| 2006/0244234 A1 | * | 11/2006 | Ramsey | 280/124.131 |
| 2009/0145721 A1 | | 6/2009 | Toews | |
| 2010/0230182 A1 | * | 9/2010 | Otto | 180/6.48 |
| 2012/0048674 A1 | * | 3/2012 | Smith et al. | 198/306 |

* cited by examiner

*Primary Examiner* — Leslie A Nicholson, III
*Assistant Examiner* — Keith R Campbell
(74) *Attorney, Agent, or Firm* — Schwabe, Williamson & Wyatt, P.C.

(57) ABSTRACT

Embodiments herein provide a support structure for a radial conveyor. The support structure may include first and second wheel assemblies that may be selectively rotated between a travel position and an operating position. The support structure may include a drive assembly having a motor. The drive assembly may selectively engage and/or disengage the motor with one or more of the wheels of the first and/or second wheel assemblies. In some embodiments, the drive assembly may include a pinion coupled to the motor, and an actuating arm to selectively engage and/or disengage the pinion with a ring gear coupled to a first wheel of the first wheel assembly.

19 Claims, 12 Drawing Sheets

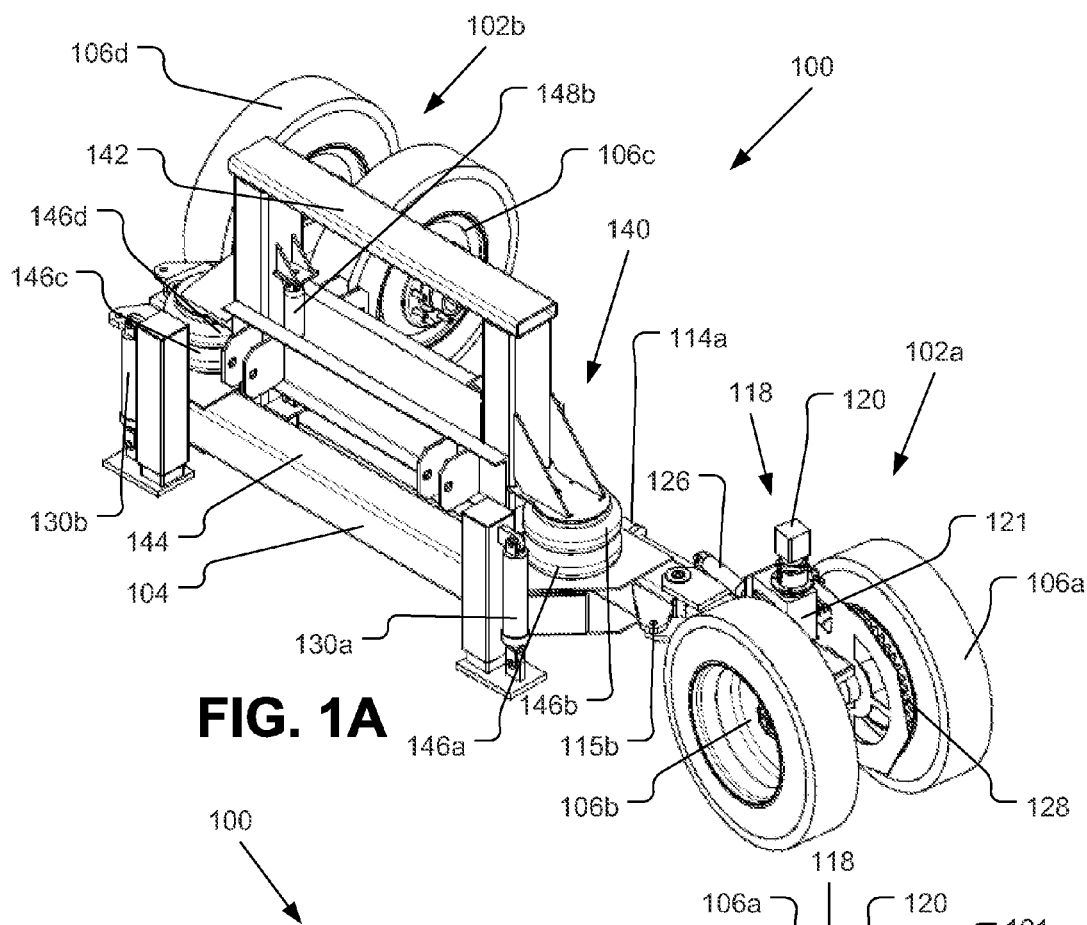
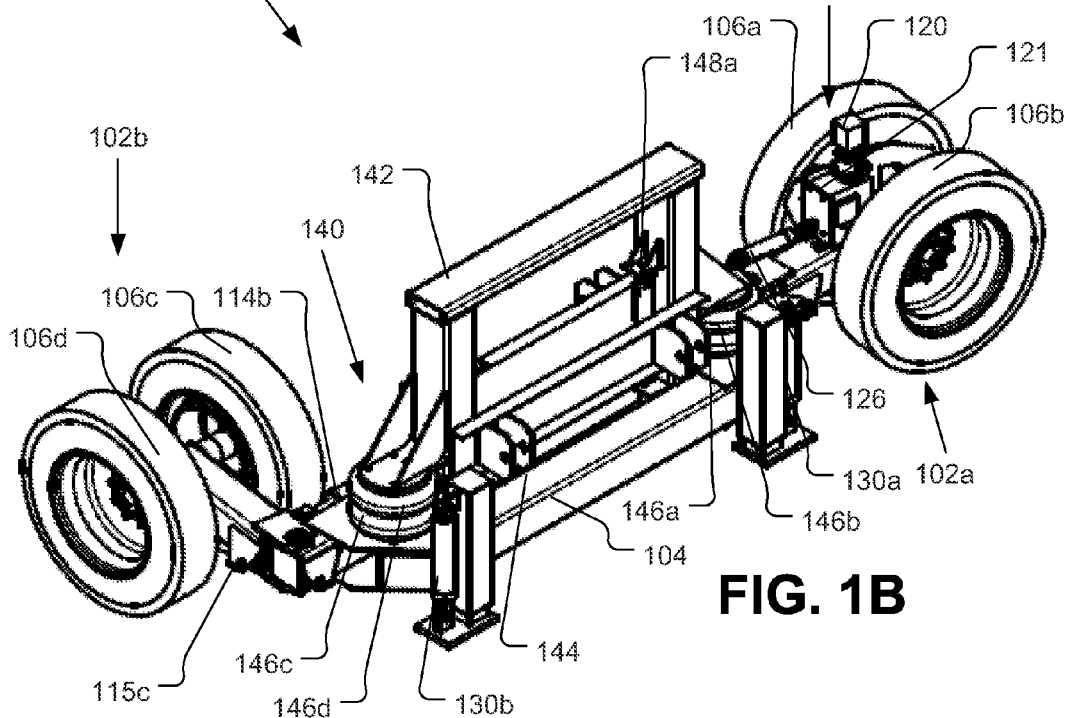

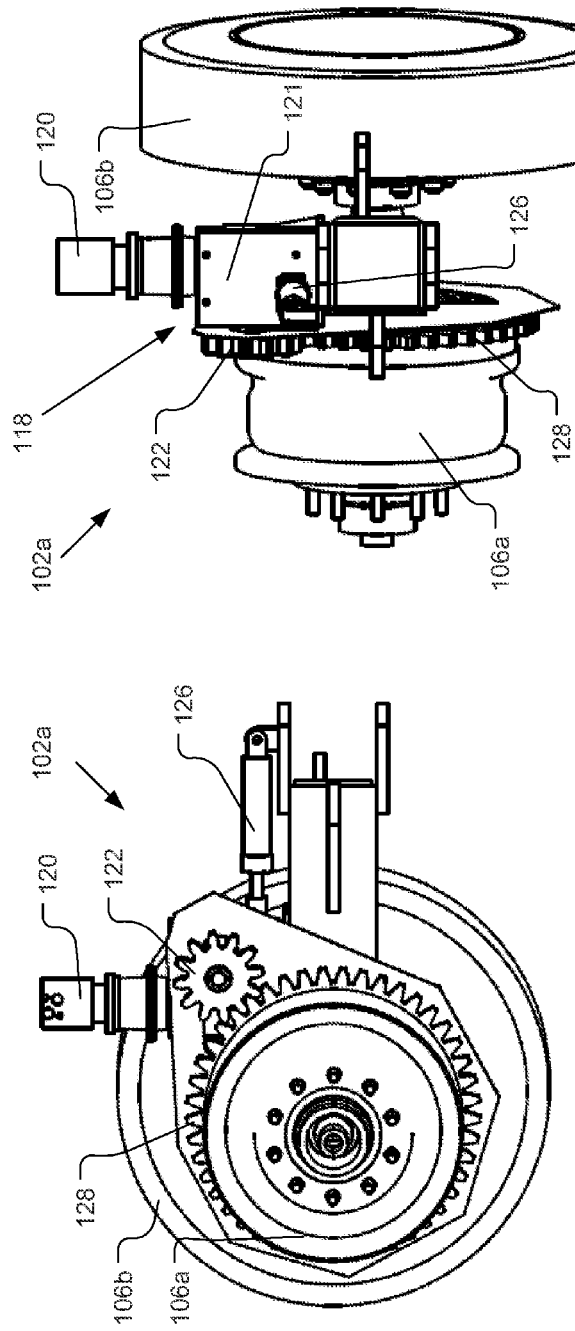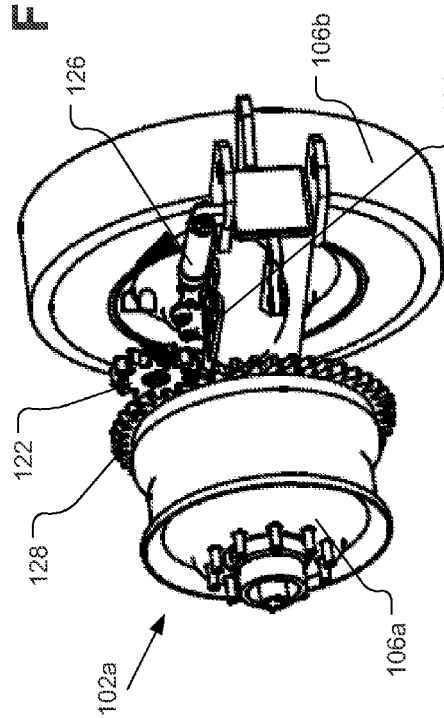
FIG. 2C
FIG. 2D
FIG. 2E

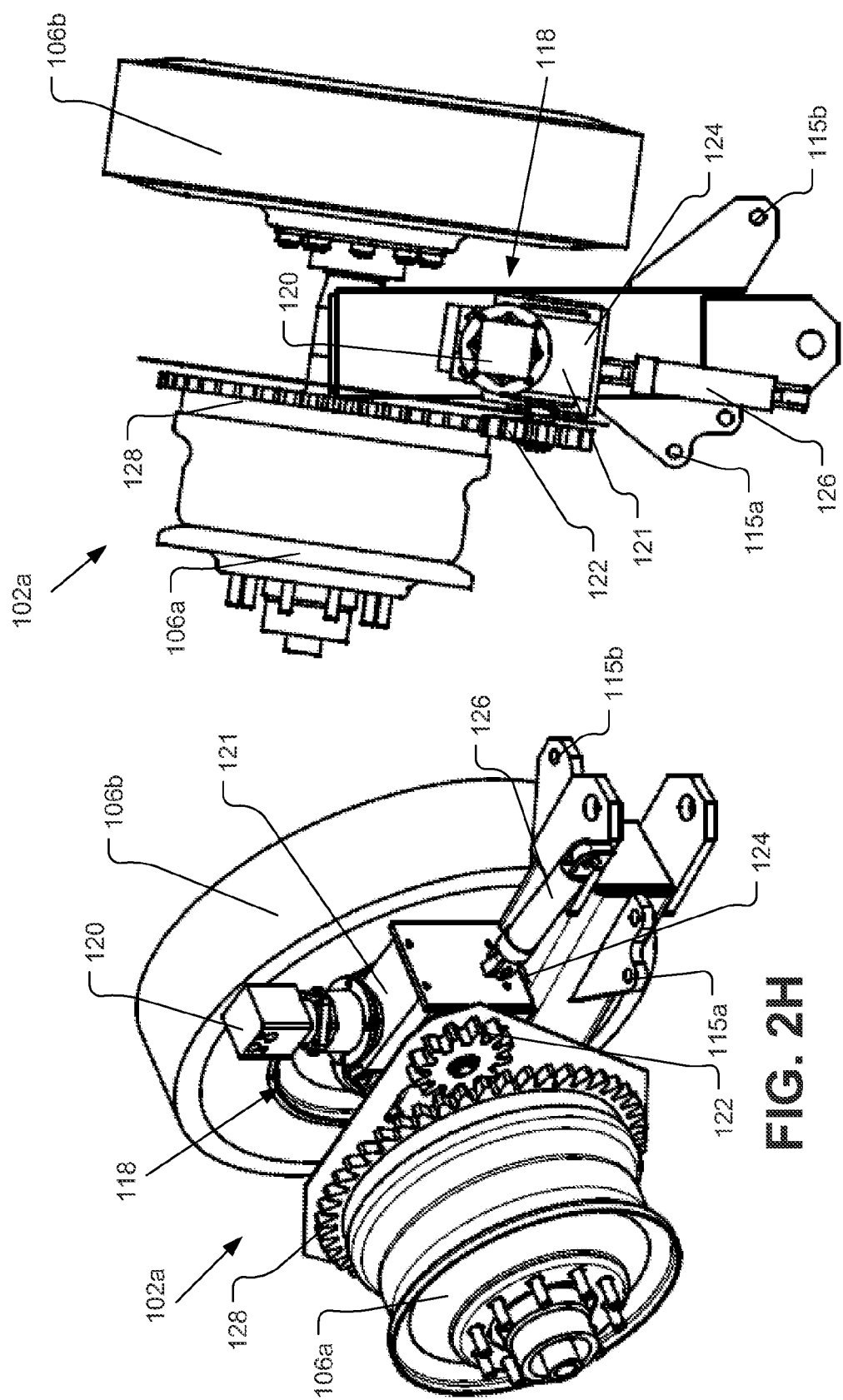

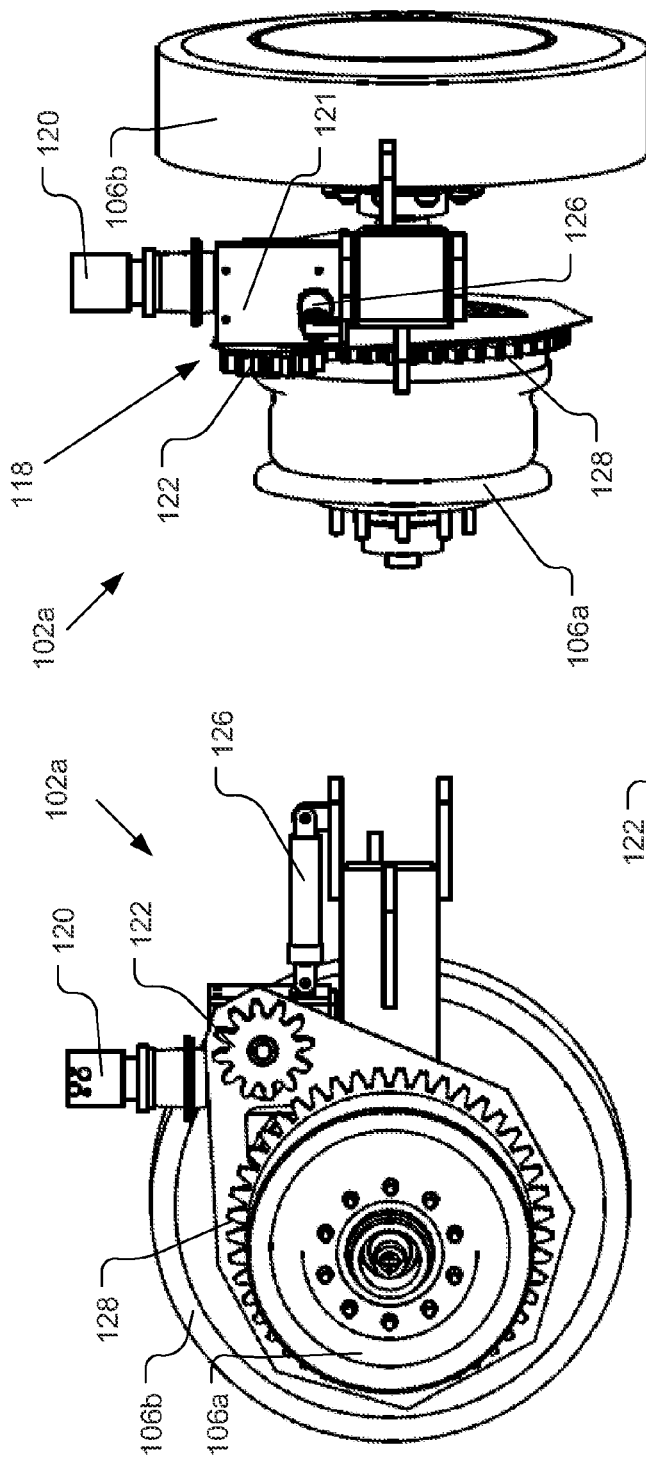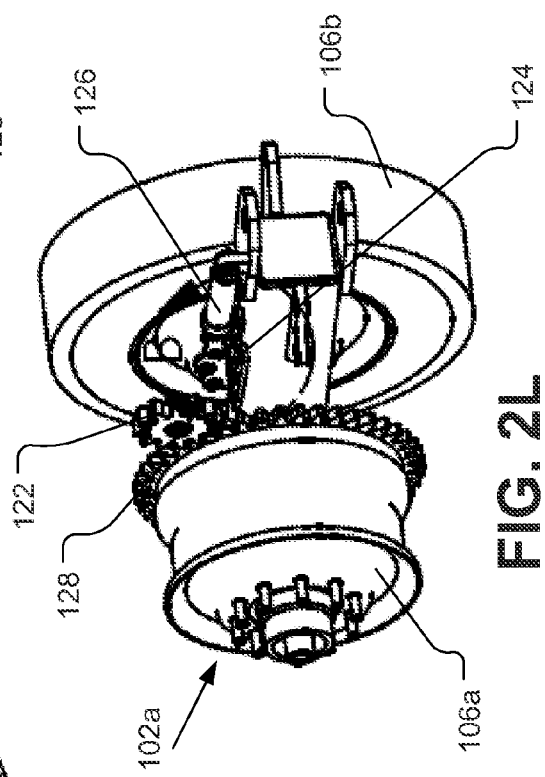

SUPPORT STRUCTURE FOR RADIAL CONVEYOR

TECHNICAL FIELD

Embodiments herein relate to the field of radial conveyors

BACKGROUND

Radial conveyors are used at gravel quarries and other venues to transport material from a feed end of the radial conveyor to a discharge or delivery end of the radial conveyor, and to make piles of the material adjacent the discharge end. The discharge end of the conveyor may be rotated radially (i.e., rotationally with respect to the longitudinal axis of the conveyor) to create piles of material spaced in an arc, thereby efficiently using the space surrounding a screening or other material-handling plant. The radial conveyors include a support system with wheels for radially driving the conveyor. Typically, the wheels are driven by a motor coupled to the wheels by a chain. In some radial conveyors, the wheels can be rotated between the radial position for radially adjusting the discharge end and a position in which the rotational axis is perpendicular to the length of the conveyor or in which the wheels extend in a direction parallel to the conveyor for transport. However, when the conveyor is to be towed, the motor must be disengaged from the wheels, requiring the chain to be unhooked. The chain must be reconnected at the job site to engage the motor to the wheels.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIGS. 1A-E illustrate various views of a support structure for a radial conveyor with a first wheel assembly of the support structure in an operational (radial) position and a second wheel assembly in a travel position, including: (A) a perspective view; (B) another perspective view; (C) a top view; (D) a front view; and (E) a side view, in accordance with various embodiments;

FIGS. 2A-D illustrate various views of the first wheel assembly of the embodiment of FIGS. 1A-I with the tire removed from one of the wheels to show underlying components and a pinion of a drive assembly engaged with a ring gear of the first wheel assembly, including: (A) a perspective view; (B) a top view; (C) a side view; and (D) a front view, in accordance with various embodiments;

FIG. 2E illustrates a perspective view of the wheel assembly of FIGS. 2A-D, with the motor and gearbox removed to show underlying components;

FIG. 2H-K illustrate various views of the wheel assembly of FIGS. 2A-G with the pinion disengaged from the ring gear, including: (H) a perspective view; (I) a top view; (J) a side view; and (K) a front view, in accordance with various embodiments;

FIG. 2L illustrates a perspective view of the wheel assembly of FIGS. 2H-K, with the motor and gearbox removed to show underlying components;

DETAILED DESCRIPTION OF DISCLOSED EMBODIMENTS

Figure 1C:
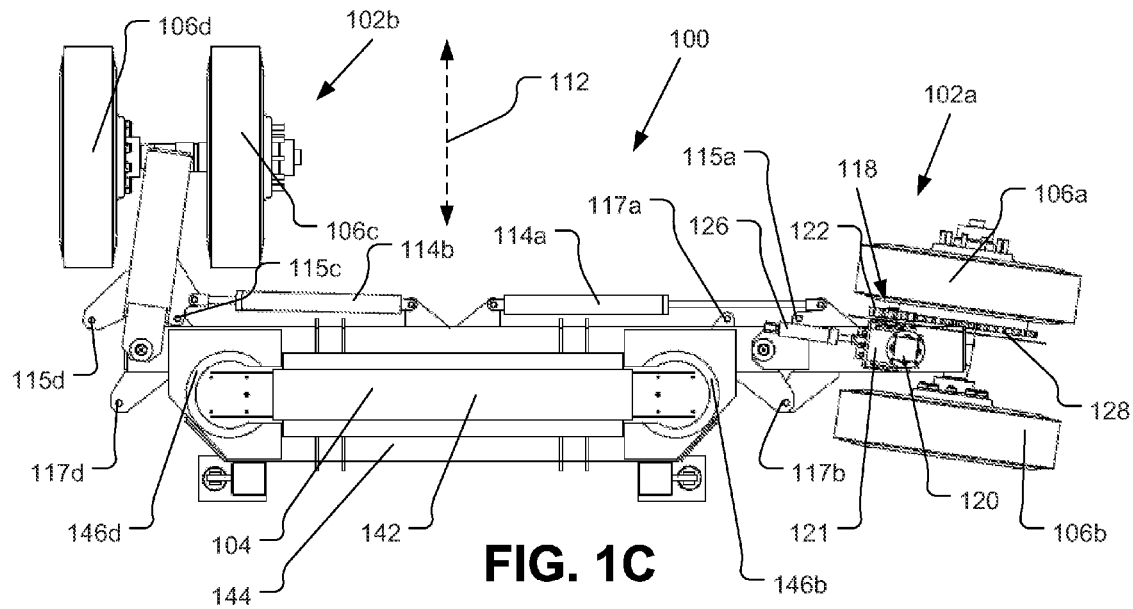
Figure 1D:
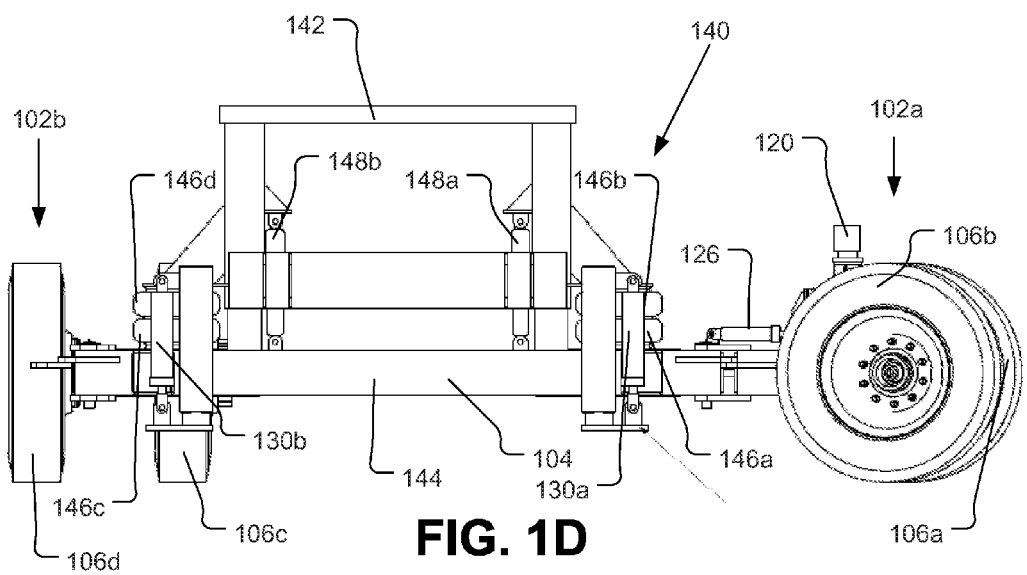
Figure 1E:
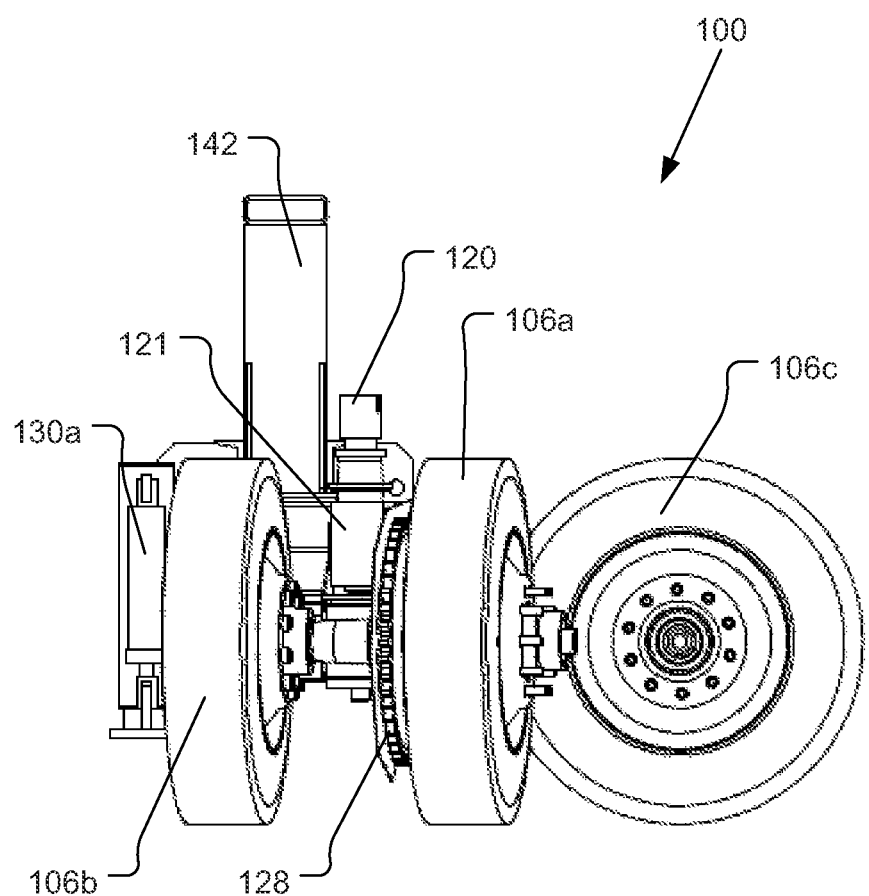

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for a support structure for a radial conveyor are provided. In exemplary embodiments, a computing device may be endowed with one or more components of the disclosed apparatuses and/or systems and may be employed to perform one or more methods as disclosed herein.

Various embodiments provide a support structure for a radial conveyor. The support structure may include first and second wheel assemblies that may be selectively rotated between a travel position and an operating position. The operating position may also be referred to as the radial position. The support structure may include a drive assembly having a motor. The drive assembly may selectively engage and/or disengage the motor with one or more of the wheels of the first and/or second wheel assemblies. In some embodiments, the drive assembly may include a pinion coupled to the motor, and an actuating arm to selectively engage and/or disengage the pinion with a ring gear coupled to a first wheel of the first wheel assembly. In some embodiments, the support structure may include a plurality of drive assemblies, with each drive assembly configured to operate a different set of one or more wheels of the support structure.

Figure 1F:
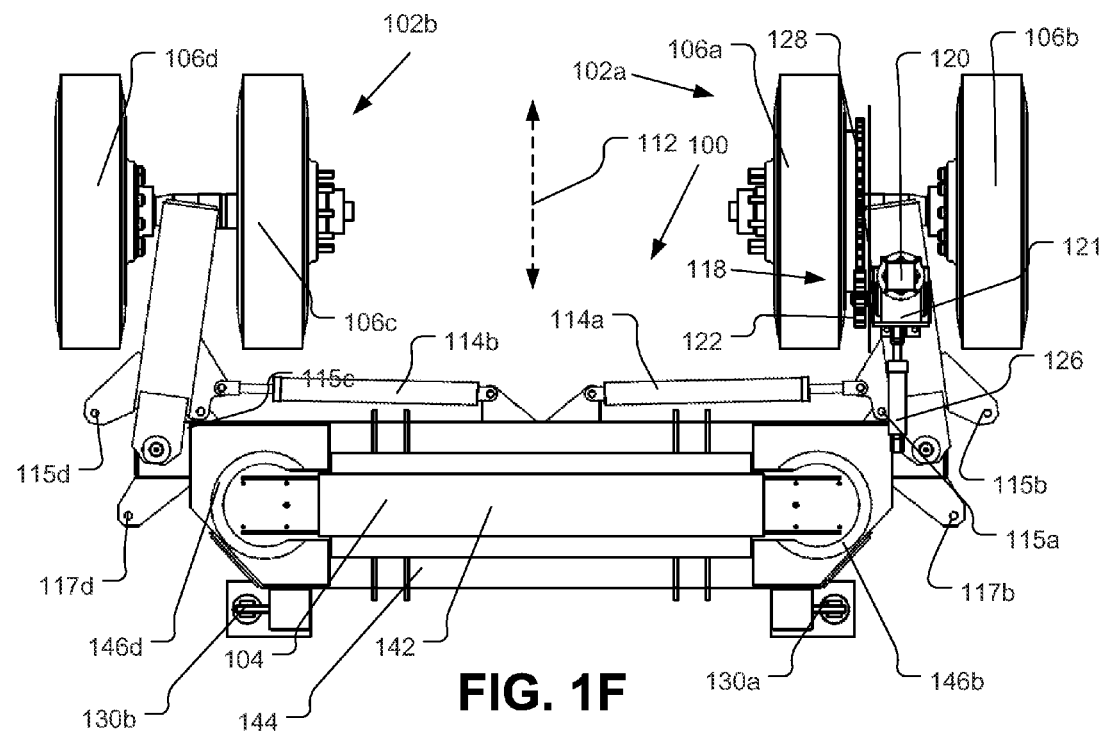
FIG. 1F illustrates a top view of the support structure of FIGS. 1A-E, with the first and second wheel assemblies in the travel position.
Figure 1G:
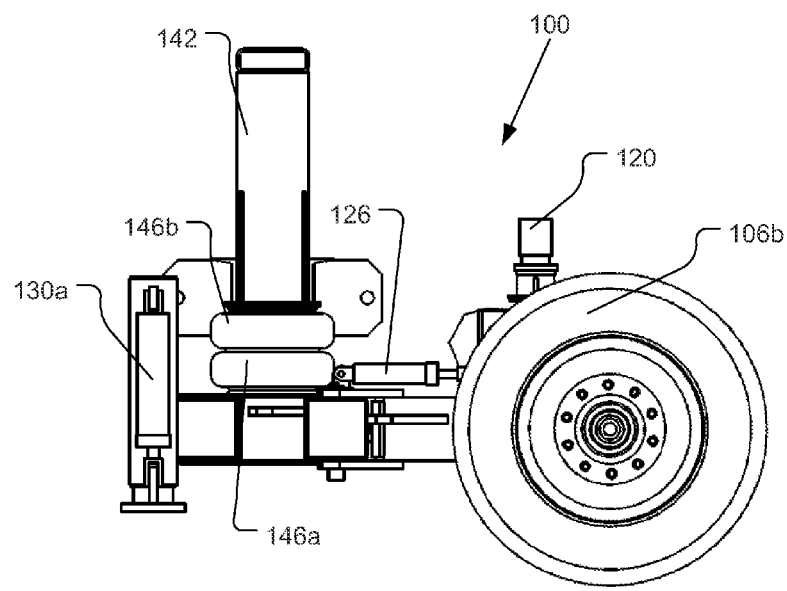
FIG. 1G illustrates a side view of the support structure of FIGS. 1A-F, with the first and second wheel assemblies in the travel position.
Figure 1H:
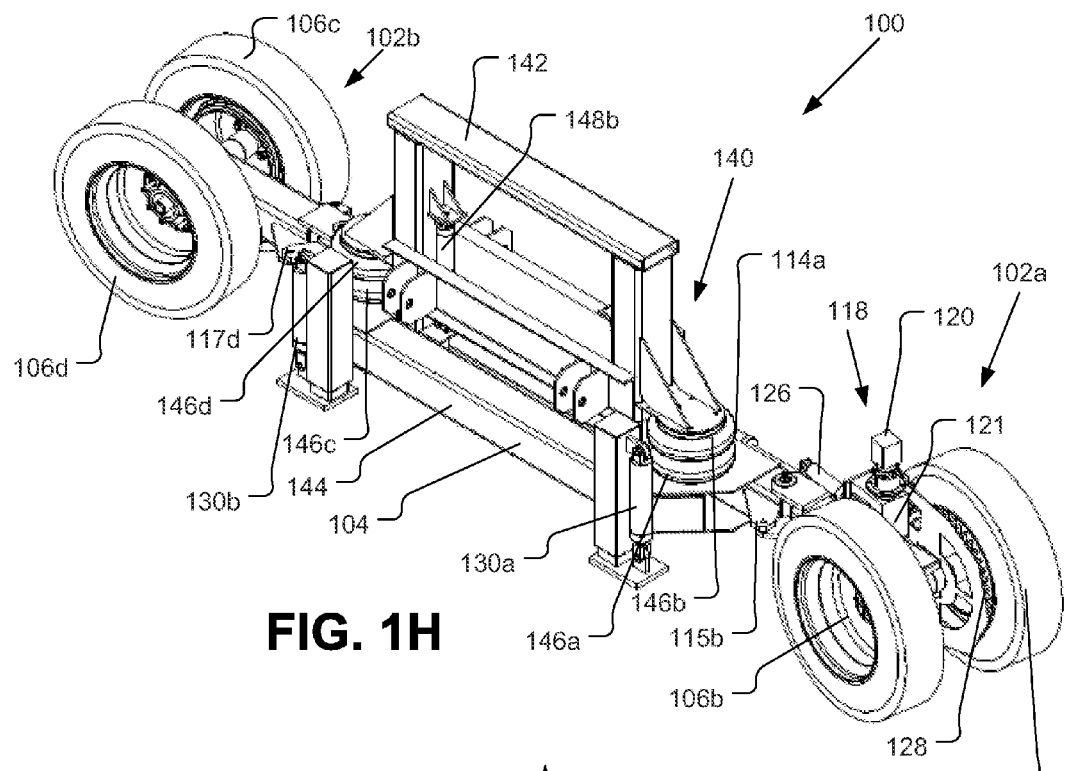
FIG. 1H illustrates a perspective view of the support structure of FIGS. 1A-G with the first and second wheel assemblies in the operational position.
Figure 1I:
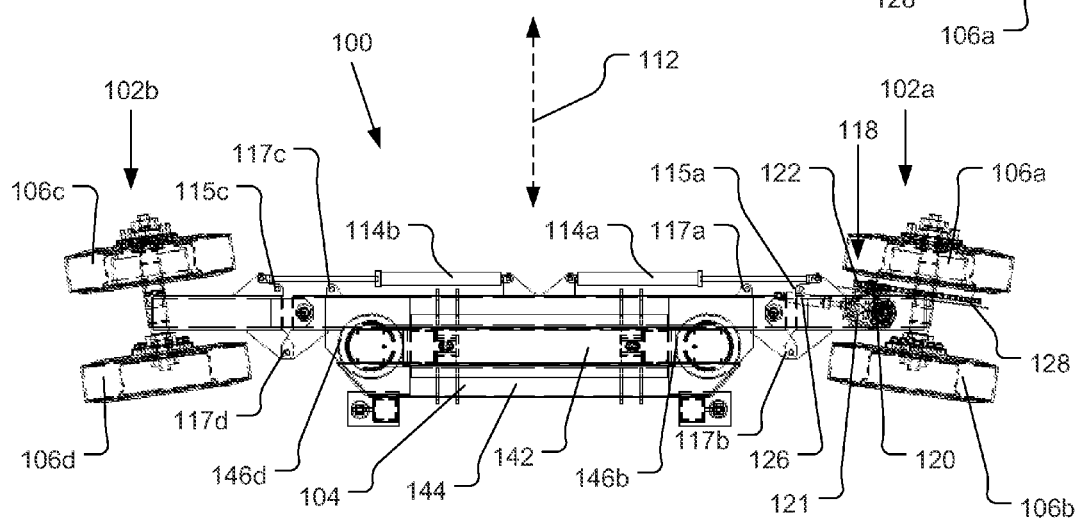
FIG. 1I illustrates a top view of the support structure of FIGS. 1A-H with the first and second wheel assemblies in the operational position, with the components of the support structure shown transparent to show underlying components.
Figures 2A, 2B:
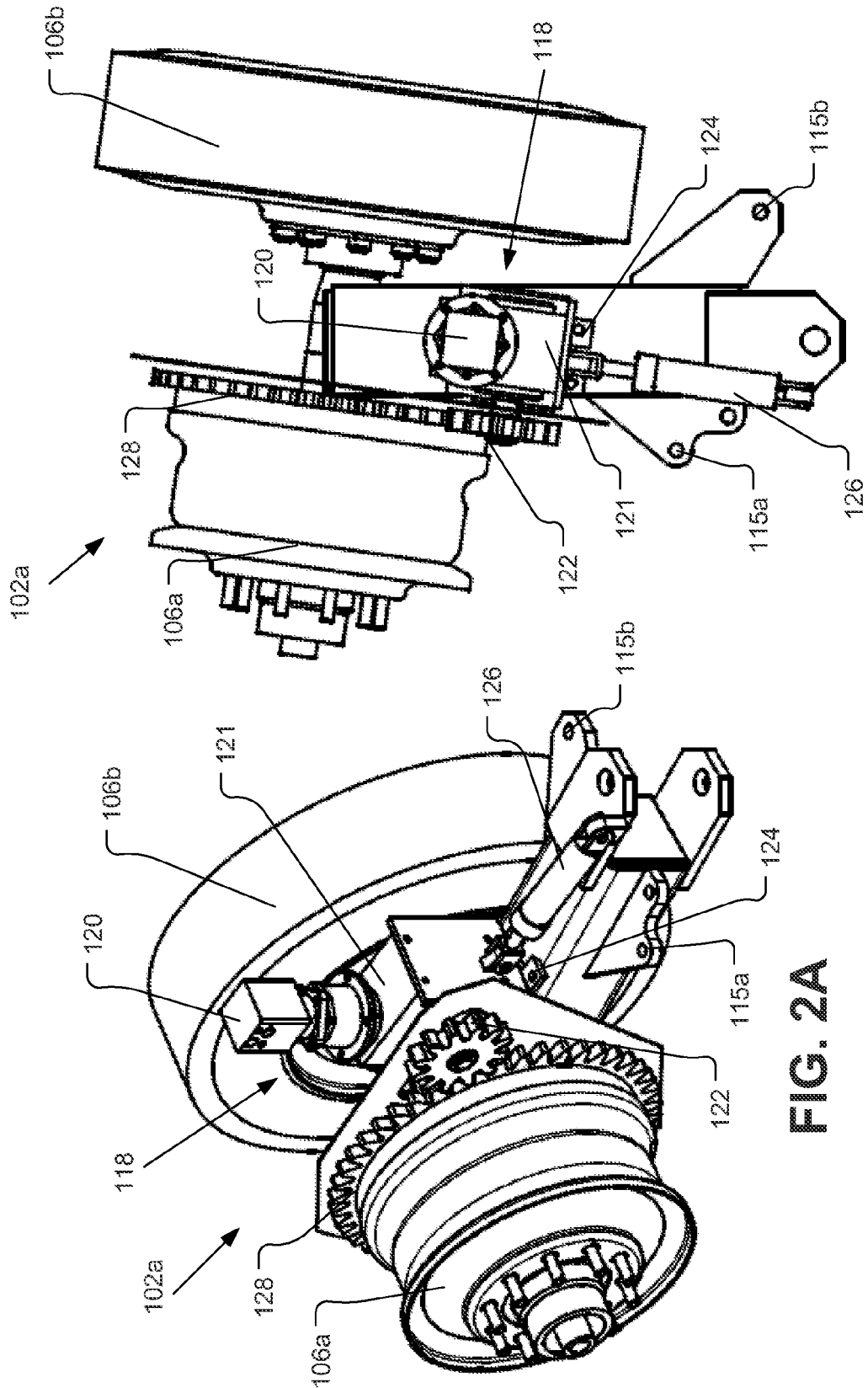
Figure 2F:
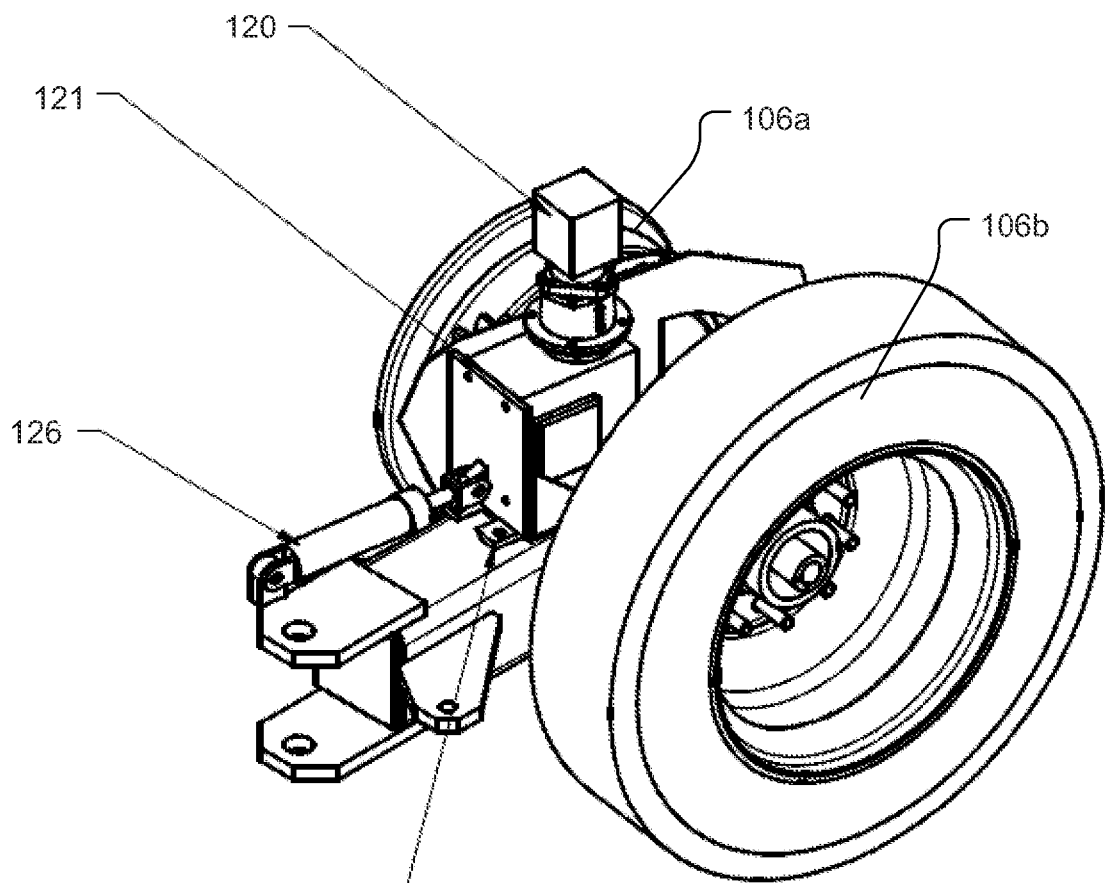
FIG. 2F illustrates a perspective view of the wheel assembly of FIGS. 2A-D.
Figure 2G:
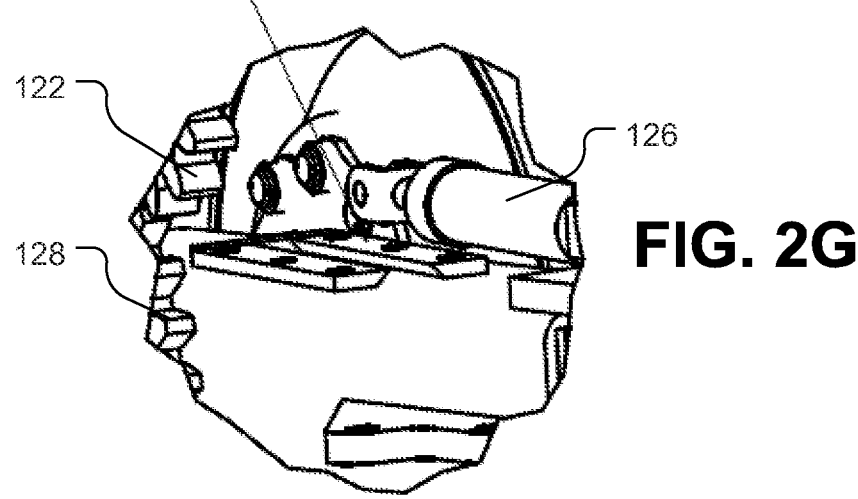
FIG. 2G illustrates a closeup view of a portion of FIG. 2E.
Figure 2M:
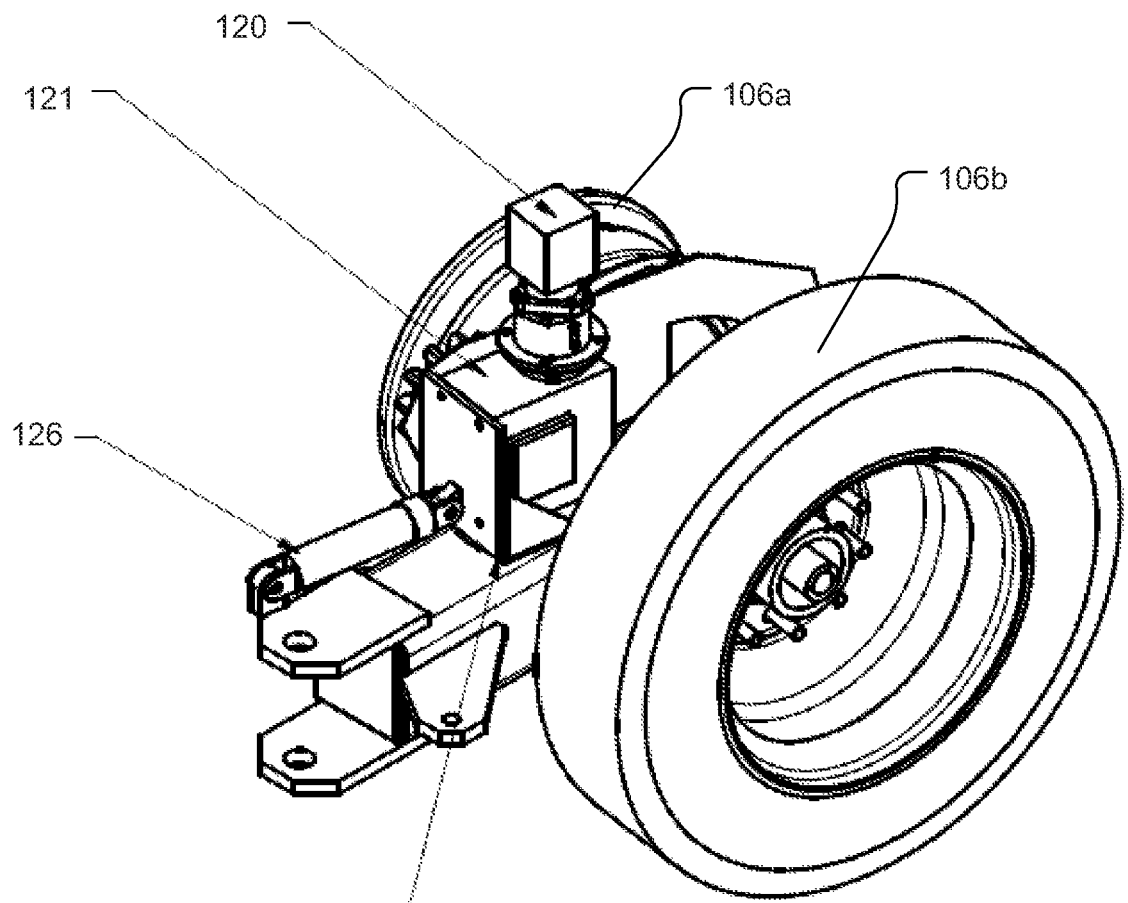
FIG. 2M illustrates a perspective view of the wheel assembly of FIGS. 2H-L.
Figure 2N:
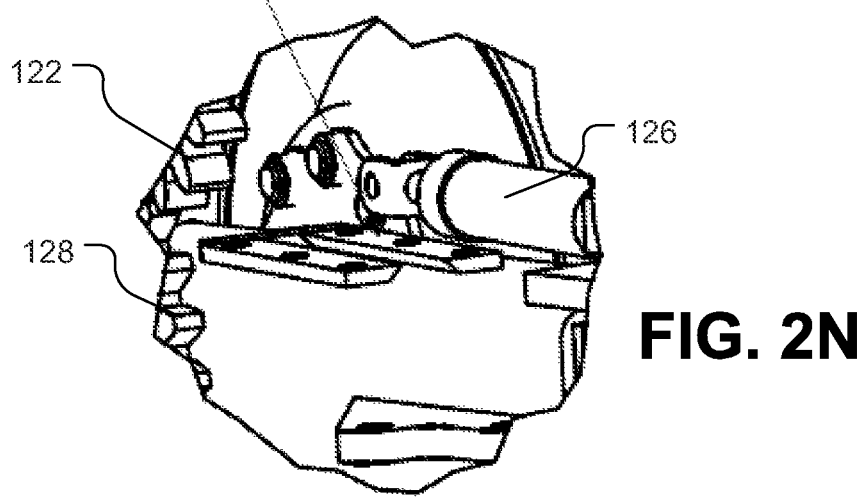
FIG. 2N illustrates a closeup view of a portion of FIG. 2L.
Figure 3:
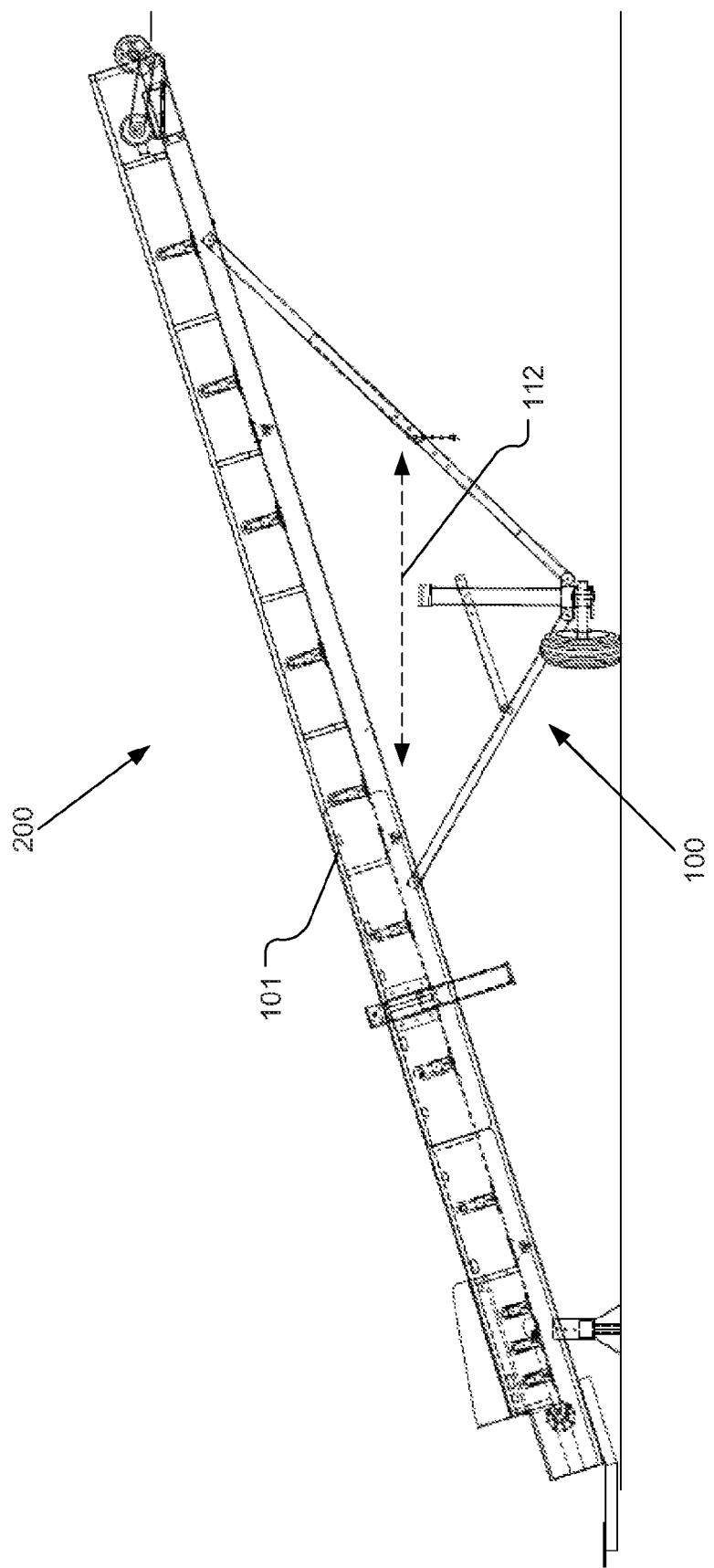
FIG. 3 illustrates a radial conveyor in accordance with various embodiments.

As shown in FIGS. 1A-1G, a support structure 100 of a radial conveyor 200 (as shown in FIG. 3) may be configured to support a conveyor structure 101 of the radial conveyor 200. The support structure 100 may include wheel assemblies 102a and 102b coupled to a body portion 104 of the support structure 100. Wheel assemblies 102a-b may each include one or more wheels. For example, wheel assembly 102a is shown to include wheels 106a and 106b, and wheel assembly 102b is shown to include wheels 106c and 106d. In other embodiments, wheel assemblies 102a and 102b may each include only one wheel. Wheel assemblies 102a-b may be pivotably coupled to the body portion 104 of support structure 100. Wheel assemblies 102a-b may pivot between a travel position and an operating (radial) position. FIGS. 1A-E show the first wheel assembly 102a in the operating position and the second wheel assembly 102b in the travel position, FIGS. 1F-G show both wheel assemblies 102a-b in the travel position, and FIGS. 1H-I show both wheel assemblies 102a-b in the operational position. In the travel position, the wheels 106a-d may be oriented substantially parallel to a longitudinal axis 112 of the radial conveyor 200 (as shown in FIGS. 1C, 1F, and 3), and while in the operating position, the wheels 102a-d may be oriented substantially perpendicular (radial) to the longitudinal axis 112 of the radial conveyor 200. The wheels 102a-d may have a slight angle from the perpendicular in the operating position, as best shown in FIGS. 1H-I, in order to provide rotational movement of the radial conveyor 200. This orientation is encompassed by the term "substantially perpendicular" as used herein.

A first actuating member 114a may be coupled between the body portion 104 of support structure 100 and wheel assembly 102a, and a second actuating member 114b may be coupled between the body portion 104 and wheel assembly 102b (as best seen in FIGS. 1C and 1F). Actuating members 114a-b may be selectively actuated to rotate the wheel assemblies 102a or 102b, respectively, between the travel position and/or the operating position. Actuating members 114a-b may include any suitable structure capable of selectively extending and/or retracting to place the wheels 102a-d in the travel position and/or the operating position. For example, the actuating members 114a-b may include one or more fluid-actuated cylinders (e.g., hydraulic and/or pneumatic cylinders) and/or servo-motors.

A pin hole 115a of wheel assembly 102a may align with a pin hole 117a of body portion 104 when the wheel assembly 102a is in the travel position (as depicted in FIGS. 1F-G), and a pin hole 115b of wheel assembly 102a may align with a pin hole 117b of body portion 104 when the wheel assembly 102a is in the operating position (as depicted in FIGS. 1A-E and 1H-I. A pin (not shown), may be disposed through the pin holes to secure the wheel assembly 102a in the travel position and/or the operating position. Wheel assembly 102b similarly may include pin holes 115c and 115d that may align with pin holes 117c and 117d, respectively, of the body portion to secure the wheel assembly 102b in the travel position and/or the operating position, respectively.

As seen in FIGS. 1A-G and 2A-N, in various embodiments, the support structure 100 may include a drive assembly 118 having a motor 120 and configured to selectively operatively engage and/or disengage the motor 120 with wheel 106a. The motor 120 may be coupled to a pinion 122. In some embodiments, the motor 120 may include a gear box 121. The motor 120 may rotate the pinion 122 when the motor 120 is driven. The motor 120 may be coupled to wheel assembly 102a by a slide assembly 124. An actuating member 126 (also referred to as drive actuating member 126) may be coupled to the motor 120 to selectively cause the motor 120 to slide with respect to the wheel assembly 102a between an engaged position (as shown in FIGS. 2A-G) and a disengaged position (as shown in FIGS. 2H-N). The wheel 102a may be coupled to a ring gear 128 so that rotation of the ring gear 128 causes the wheel 102a to rotate. The pinion 122 may operatively engage the ring gear 128 when the motor 120 is in the engaged position, and may not engage the ring gear 128 when the motor 120 is in the unengaged position. When the motor 120 is in the engaged position, the motor 120 may rotate the pinion 122, thereby rotating the ring gear 128 and the wheel 106a. When the wheels 106a-d are in the operating position, the rotation of wheel 102a may cause the support structure 100 to move radially (i.e., rotate and/or move the conveyor 101 rotationally with respect to the longitudinal axis 112 of radial conveyor 200). In some embodiments, the radial movement of the support structure 100 may cause a discharge end of the conveyor 101 to move while a feed end of the conveyor 101 stays substantially in the same location.

Although drive assembly 118 is shown to selectively drive wheel 106a, in other embodiments, the drive assembly 118 may selectively drive any combination of one or more of the wheels 106a-d. The drive assembly 118 may include a pinion for each wheel that is driven by the drive assembly 118.

Furthermore, in some embodiments, the support structure may include more than one drive assembly. For example, a second drive assembly may be coupled to the second wheel assembly 102b and configured to drive wheel 106c and/or wheel 106d. The second drive assembly may be similar to the first drive assembly 118 and may have the same gear ratio between the pinion and the ring gear (and/or the same gearbox ratio) as the first drive assembly 118. In some embodiments, the plurality of drive assemblies may be controlled by the same control mechanism so that they start and/or stop at the same time. A support structure with two or more drive assemblies may be especially suitable for larger and/or heavier conveyors.

In some embodiments, the support structure 100 may include jacking mechanisms 130a and 130b. Jacking mechanism 130a may lift wheels 106a-b off the ground when jacking mechanism 130a is actuated. Similarly, jacking mechanism 130b may lift wheels 106c-d off the ground when jacking mechanism 130b is actuated. In some embodiments, jacking mechanism 130a and/or 130b may include a fluid-actuated cylinder. Jacking mechanism 130a may be coupled to any suitable portion of support structure 100, such as body portion 104 and/or first wheel assembly 102a. Similarly, jacking mechanism 130b may be coupled to any suitable portion of support structure 100, such as body portion 104 and/or second wheel assembly 102b. Jacking mechanisms 130a and/or 130b may be actuated by any suitable means, such as hydraulically, pneumatically, and/or electronically. In use, wheels 106a-b may be lifted by jacking mechanism 130a to facilitate switching the wheel assembly 102a from the travel position 108 to the operating position 110, and vice versa. In some embodiments, the motor 120 may also be switched to the engaged position while wheels 106a-b are lifted. Switching the motor 120 to the engaged position while wheel 106a is lifted may facilitate the pinion 122 becoming operatively engaged with the ring gear 128, because the ring gear 128 will be able to freely rotate to allow teeth of the pinion 122 engage with teeth of the ring gear 128. The wheels 106a-b may then be lowered by jacking mechanism 130a.

Similarly, wheels 106c-d may be lifted by jacking mechanism 130b to facilitate switching the wheel assembly 102b from the travel position 108 to the operating position 110, and vice versa. The jacking mechanism 130b may then lower wheels 106c-d.

In some embodiments, a control mechanism may be provided for selectively controlling the actuating members 114a-b, actuating member 126, and/or jacking mechanisms 130a-b. In some embodiments, the actuating members 114a-b, actuating member 126, and jacking mechanisms 130a-b may all be fluid-actuated (e.g., hydraulically and/or pneumatically actuated). The actuating members 114a-b, actuating member 126, and/or jacking mechanisms 130a-b may be coupled to a valve bank (not shown) for controlling delivery of actuating fluid (e.g., hydraulic fluid and/or air) to the actuating members 114a-b, actuating member 126, and/or jacking mechanisms 130a-b. The valve bank may include a local control mechanism, such as one or more levers and/or buttons, for manually controlling the actuating members 114a-b, actuating member 126, and/or jacking mechanisms 130a-b. Additionally, or alternatively, a remote controller (not shown) may be provided for remotely controlling the valve bank, and thereby controlling operation of the actuating members 114a-b, actuating member 126, and/or jacking mechanisms 130a-b.

In use, the wheel assemblies 102a-b may be in the travel position 108 (as shown in FIGS. 1F-G), and the drive assembly 118 may be in the disengaged position (as shown in FIGS. 2H-N), for transporting the radial conveyor 200 to the job site (i.e., the location where the radial conveyor is to be used) and/or around the job site. The radial conveyor 200 may be towed by a vehicle to transport the radial conveyor 200, and the motor 118 may not be engaged with wheel 102a, allowing the wheels 102a-d to freely rotate. If motor 120 were engaged with wheel 102a, the rotation of wheel 102a during transport may be prevented/hindered and/or may cause damage to the motor 120.

Once the radial conveyor 200 is in position at the job site, the operator may switch the wheel assemblies 102a-b from the travel position to the operating (radial) position. The wheel assemblies 102a-b may be switched one at a time. For example, the first wheel assembly 102a may be lifted using jacking mechanism 130a. Wheel assembly 102a may then be switched to the operating position by actuating member 114a, and the pinion 122 may be engaged with ring gear 128 (as shown in FIGS. 2H-N) by actuating member 126. Then, wheel assembly 102a may be lowered back to the ground by jacking mechanism 130a. This transitional state, in which the first wheel assembly 102a in the operating position and the second wheel assembly 102b in the travel position, is shown in FIGS. 1A-E.

After the first wheel assembly 102a is placed in the operating position and lowered back to the ground, the second wheel assembly 102b may be lifted off the ground by jacking mechanism 130b. Wheel assembly 102b may then be switched to the operating position by actuating member 114b, and wheel assembly 102b may be lowered back to the ground by jacking mechanism 130b. Both wheel assemblies 102a-b will then be in the operating position, as shown in FIGS. 1H-I.

In other embodiments, the second wheel assembly 102b may be switched to the operating position prior to switching the first wheel assembly 102a to the operating position.

The wheel assemblies 102a-b may be switched from the operating position back to the travel position by a similar method to that described above for switching the wheel assemblies 102a-b from the travel position to the operating position.

The drive assembly 118 of support structure 100 may allow the operator to engage and/or disengage the motor 120 relatively quickly and easily. Furthermore, the actuating members 114a-b may facilitate relatively quick and easy transition of the wheel assemblies 102a and/or 102b between the travel position and the operating position.

In various embodiments, the support structure 100 may include a suspension system 140 coupled between an upper portion 142 (also referred to as an upper frame) and a lower portion 144 (also referred to as a lower frame) of the body 104. The conveyor 101 may rest on the upper portion 142 during transport of the radial conveyor 200. The suspension system 140 may dampen vibrations between the lower portion 144 and upper portion 142, which may increase safety and/or prevent damage while transporting the radial conveyor 200.

The suspension system 140 may include inflatable support elements 146a, 146b, 146c, and 146d disposed between the upper portion 142 and the lower portion 144. The support elements 146a-d may be inflated with a fluid, such as air or hydraulic oil, and/or another suitable substance, to dampen forces and/or vibrations between lower portion 144 and upper portion 142. The inflatable support elements 146a-d may also include a bumper structure to provide rigid support to the upper portion 144 when the inflatable support elements 146a-d are not inflated. In use, the inflatable support elements 146a-d may be inflated for transporting the radial conveyor 200, and deflated when the radial conveyor 200 is in position for use at the job site. Appropriate inflatable support elements are depicted and described in co-pending patent application Ser. No. 12/869,093, entitled "CONVEYOR SYSTEMS," which is incorporated by reference herein for all purposes.

As shown in FIGS. 1A-G, inflatable support element 146b may be stacked on top of inflatable support element 146a between a first portion of upper body portion 142 and a first portion of lower body portion 144, and inflatable support element 146d may be stacked on top of inflatable support element 146c between a second portion of upper body portion 142 and lower body portion 144. In other embodiments, any suitable arrangement of inflatable support elements 146a-d may be used. Furthermore, although the suspension system 140 is shown to include four inflatable support elements 146a-d, in other embodiments the suspension system 140 may include any suitable number of one or more inflatable support elements.

In some embodiments, the suspension system 140 may also include shocks 148a and 148b coupled between the upper portion 142 and the lower portion 144. Shocks 148a-b may dampen forces and/or vibrations between upper portion 142 and lower portion 144.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A support structure for a radial conveyor, comprising:
   a body portion configured to support a conveyor belt structure;
   a first wheel assembly pivotably coupled to the body portion and including one or more wheels including a first wheel, the first wheel coupled to a ring gear;
   a second wheel assembly pivotably coupled to the body portion and including one or more wheels;
   a drive assembly coupled to the first wheel assembly, the drive assembly including:
      a motor operatively coupled to a pinion;
      a drive actuating member coupled to the motor and configured to selectively slide the motor with respect to the wheel assembly, wherein selectively sliding the motor comprises moving the motor between an engaged position and a disengaged position, wherein sliding the motor selectively engages and/or disengages the pinion with the ring gear of the first wheel, and wherein the motor is configured to rotate the pinion and thereby rotate the first wheel when the pinion is engaged with the ring gear.

2. The support structure of claim 1, further comprising:
   a first actuating member coupled between the first wheel assembly and the body portion and configured to selectively pivot the first wheel assembly between a travel position, in which the one or more wheels of the first wheel assembly are substantially parallel to a longitudinal axis of the radial conveyor, and an operating position, in which the one or more wheels of the first wheel assembly are substantially perpendicular to the longitudinal axis; and
   a second actuating member coupled between the second wheel assembly and the body portion and configured to selectively pivot the first wheel assembly between a travel position, in which the one or more wheels of the first wheel assembly are substantially parallel to the longitudinal axis, and an operating position, in which the one or more wheels of the first wheel assembly are substantially perpendicular to the longitudinal axis.

3. The support structure of claim 2, wherein the first actuating member includes a first fluid-actuated cylinder, the second actuating member includes a second fluid-actuated cylinder, and the drive actuating member includes a third fluid-actuated cylinder, and the support structure further includes a valve bank coupled to the first, second, and third fluid-actuated cylinders to selectively actuate the first, second, and/or third fluid-actuated cylinders.

4. The support structure of claim 3, further comprising a remote controller communicatively coupled to the valve bank to control actuation of the first fluid-actuated cylinder, the second fluid-actuated cylinder, and/or the third fluid-actuated cylinder.

5. The support structure of claim 1, further comprising:
   a first jacking mechanism configured to selectively lift the one or more wheels of the first wheel assembly off the ground; and
   a second jacking mechanism configured to selectively lift the one or more wheels of the second wheel assembly off the ground.

6. The support structure of claim 1, wherein the first wheel assembly includes a second wheel in addition to the first wheel, and the second wheel assembly includes a third wheel and a fourth wheel.

7. The support structure of claim 1, wherein the body portion includes an upper body portion and a lower body portion, and wherein the support structure further includes a suspension system coupled between the upper body portion and the lower body portion, the suspension system including one or more inflatable support elements, the inflatable support elements including bumpers to provide rigid support for the upper body portion when the inflatable support elements are deflated.

8. The support structure of claim 1, wherein the motor is coupled to the pinion by a gear box.

9. A support structure for a radial conveyor, comprising:
   a body portion configured to support a conveyor belt structure;
   a first wheel assembly pivotably coupled to the body portion and including one or more wheels including a first wheel;
   a second wheel assembly pivotably coupled to the body portion and including one or more wheels;
   a first actuating member coupled between the first wheel assembly and the body portion and configured to selectively pivot the first wheel assembly between a travel position, in which the one or more wheels of the first wheel assembly are substantially parallel to a longitudinal axis of the radial conveyor, and an operating position, in which the one or more wheels of the first wheel assembly are oriented radially with respect to the longitudinal axis of the radial conveyor;
   a second actuating member coupled between the second wheel assembly and the body portion and configured to selectively pivot the first wheel assembly between a travel position, in which the one or more wheels of the first wheel assembly are substantially parallel to the longitudinal axis of the radial conveyor, and an operating position, in which the one or more wheels of the first wheel assembly are oriented radially with respect to the longitudinal axis of the radial conveyor; and
   a drive assembly coupled to the first wheel assembly, the drive assembly including a motor and a third actuating member, the third actuating member configured to selectively slide the motor to engage and/or disengage the motor with the first wheel of the first wheel assembly.

10. The support structure of claim 9, further comprising:
   a first jacking mechanism coupled to the body portion and configured to selectively lift the one or more wheels of the first wheel assembly off the ground; and
   a second jacking mechanism coupled to the body portion and configured to selectively lift the one or more wheels of the second wheel assembly off the ground.

11. The support structure of claim 10, wherein the first actuating member includes a first fluid-actuated cylinder, the second actuating member includes a second fluid-actuated cylinder, the third actuating member includes a third fluid-actuated cylinder, the first jacking mechanism includes a fourth fluid-actuated cylinder, and the second jacking mechanism includes a fifth fluid-actuated cylinder, and the support structure further includes a valve bank coupled to the first, second, third, fourth, and fifth fluid-actuated cylinders to selectively actuate the first, second, third, fourth, and/or fifth fluid-actuated cylinders.

12. The support structure of claim 11, further comprising a remote controller communicatively coupled to the valve bank to control actuation of the first fluid-actuated cylinder, the second fluid-actuated cylinder, the third fluid-actuated cylinder, the fourth fluid actuated cylinder, and/or the fifth fluid-actuated cylinder.

13. The support structure of claim 9, wherein the motor is operatively coupled to a pinion, and the third actuating member is configured to selectively slidably engage and/or disengage the pinion with a ring gear coupled to the first wheel.

14. The support structure of claim 13, wherein the motor is coupled to the first wheel assembly by a slide assembly, and the third actuating member is configured to selectively slide the motor with respect to the first wheel assembly to engage and/or disengage the pinion with the ring gear.

15. A method comprising:
rotating a first wheel assembly of a support structure for a radial conveyor from a travel position, in which one or more wheels of the first wheel assembly are substantially parallel to a longitudinal axis of the radial conveyor, to a radial position, in which the one or more wheels of the first wheel assembly are substantially perpendicular to the longitudinal axis of the radial conveyor; and
slidably engaging, by a drive assembly coupled to the first wheel assembly, a pinion coupled to a motor with a ring gear coupled to a first wheel of the one or more wheels of the first wheel assembly so that the motor is operatively coupled to the first wheel.

16. The method of claim 15, wherein the motor is coupled to the first wheel assembly by a slide assembly, and wherein the pinion is engaged with the ring gear by actuating a drive actuating member to move the motor and the pinion, via the slide assembly, with respect to the first wheel assembly.

17. The method of claim 15, wherein the rotating the first wheel assembly comprises actuating a first actuating member coupled between a body portion of the support structure and the first wheel assembly to rotate the first wheel assembly from the travel position to the radial position.

18. The method of claim 15, further comprising:
lifting, by a jacking mechanism, the one or more wheels of the first wheel assembly off the ground prior to rotating the first wheel assembly from the travel position to the radial position; and
lowering, by the jacking mechanism, the one or more wheels of the first wheel assembly to the ground after rotating the first wheel assembly from the travel position to the radial position.

19. The method of claim 18, wherein the jacking mechanism comprises a first jacking mechanism, and the method further comprising:
lifting, by a second jacking mechanism, one or more wheels of a second wheel assembly of the support structure off the ground;
rotating the second wheel assembly from a travel position, in which the one or more wheels of the second wheel assembly are substantially parallel to the longitudinal axis of the radial conveyor, to a radial position, in which the one or more wheels of the second wheel assembly are substantially perpendicular to the longitudinal axis of the radial conveyor.

* * * * *